J. L. LA VAKE.
AUTO PULLER.
APPLICATION FILED SEPT. 30, 1915.
1,179,115.
Patented Apr. 11, 1916.
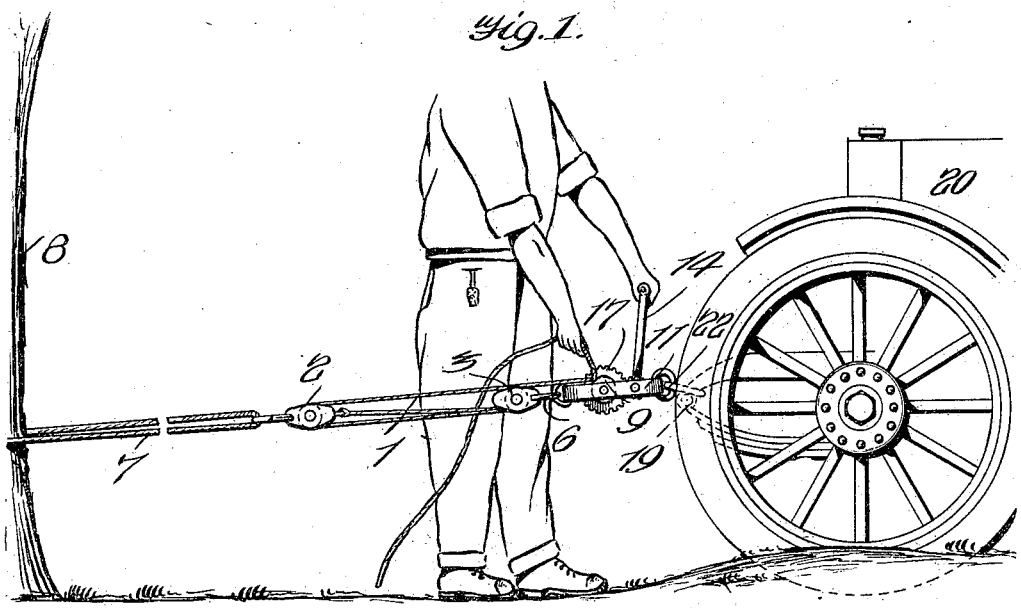
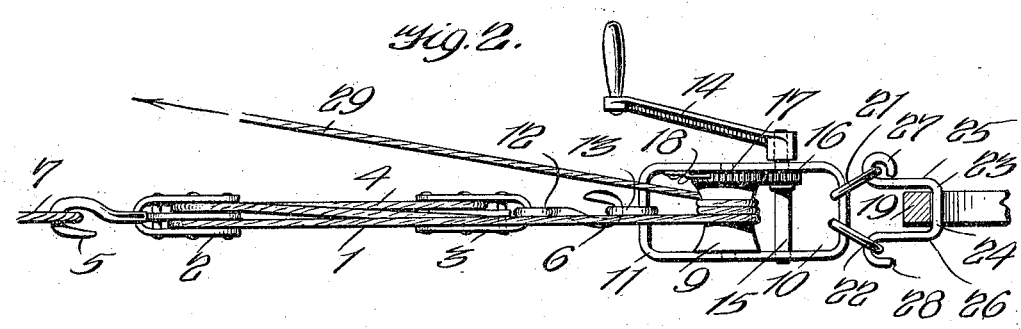
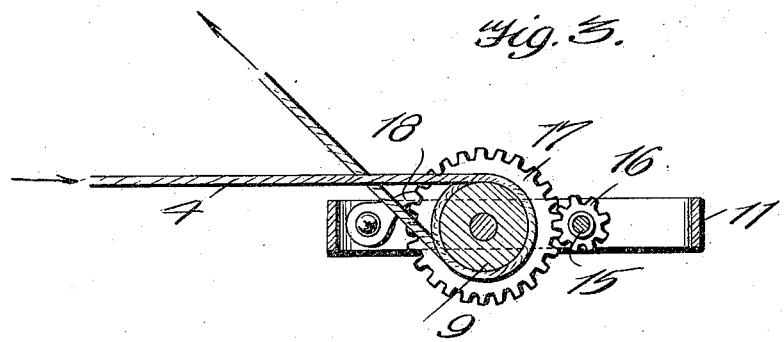
WITNESSES:
E. M. Callaghan
H. E. Beck
INVENTOR
John L. LaVake,
BY Munn & Co.
ATTORNEYS

UNITED STATES PATENT OFFICE.

JOHN LEWIS LA VAKE, OF EUSTIS, FLORIDA.

AUTO-PULLER.

1,179,115.      Specification of Letters Patent.     Patented Apr. 11, 1916.

Application filed September 30, 1915. Serial No. 53,275.

*To all whom it may concern:*

Be it known that I, JOHN L. LA VAKE, a citizen of the United States, and a resident of Eustis, in the county of Lake and State of Florida, have made certain new and useful Improvements in Auto-Pullers, of which the following is a specification.

This invention is an improvement in pulling devices for automobiles and consists of certain constructions, combinations and arrangements of parts hereinafter described and claimed.

Among the objects of my invention is to provide compact and easily portable means for extricating stalled automobiles. I accomplish this object by means of the mechanism shown in the accompanying drawing in which the same reference numerals apply to the same parts throughout and in which:—

Figure 1 is a general view showing the manner of assembling and using my automobile puller. Fig. 2 is a plan view of the device, and Fig. 3 is a vertical, longitudinal, sectional view of the winch mechanism I employ.

In the practical embodiment and use of my invention I employ the compound tackle designated 1 which comprises the pulley blocks 2 and 3 and cable 4. Pulley blocks 2 and 3 are provided with hooks 5 and 6. An anchoring means 7, which may be of rope, chain, single wire or wire cable, is attached to hook 5 and suitable anchoring means 8. Cable 4 is secured at one end to block 2 in the customary manner, then passes through blocks 2 and 3 in as many bights as there are sheaves in said blocks, then is caught in several bights around drum 9 journaled in winch 10. Sheave 3 is attached to frame 11 of winch 10 by means of hook 12 and link 13. Drum 9 is caused to rotate by means of crank 14 secured to shaft 15 journaled in frame 11. Shaft 15 has secured thereon pinion 16 which is in mesh with gear secured to drum 9. Drum 9 is retained in any desired position by pawl 18 mounted on frame 11. Winch 10 is fastened to any suitable part 19, such as an axle or spring, of the stalled automobile 20 by means of closed links 21 and 22 and substantially U-shaped hook member 23. Said hook member is formed of suitable bar-iron with a substantially straight portion 24 having like dimensioned arms 25 and 26 extending from the ends thereof and all lying in the same plane. Arm 25 terminates in a portion 27 closed over link 21. Arm 26 ends in a hook 28 which is adapted to be hooked into link 22.

I will now set forth the manner of using my automobile puller. When for any reason an automobile is stalled and it is desired to move it from its stalled position, my puller, which is so compact it can be kept in the automobile, is attached by means of anchor member 7 to any suitable anchorage which may be a tree, fence post, rock, telephone pole, land anchor or stake driven in the ground. The hook 23 is passed through or around some substantial part of the automobile and secured thereto by engaging hook 28 through link 22. Hook 6 is then engaged in link 13 and several bights of cable 4 are passed around drum 9. The operator then grasps free end 29 of cable 4 with one hand and with the other, through crank 14, shaft 15 and gears 16 and 17 actuates drum 9. This causes blocks 2 and 3 to approach each other, as is obvious, and hence causes the speedy extrication of the stalled machine.

I claim:

The combination with a winch, and a tackle connected thereto, of a substantially U-shaped hook member adapted for detachable engagement with an automobile frame, closed links for connecting said hook member with the frame of the winch, and one of said links being detachably connected with the hook member, whereby the latter may be conveniently applied to, and detached from, an automobile frame, as described.

JOHN LEWIS LA VAKE.

Witnesses:
   HENRY W. BISHOP,
   GRACE E. MILLER.